Aug. 26, 1969        S. M. MILLS        3,463,351
SAFETY PRESSURE RELIEF DEVICE
Filed Feb. 6, 1967                     3 Sheets-Sheet 1
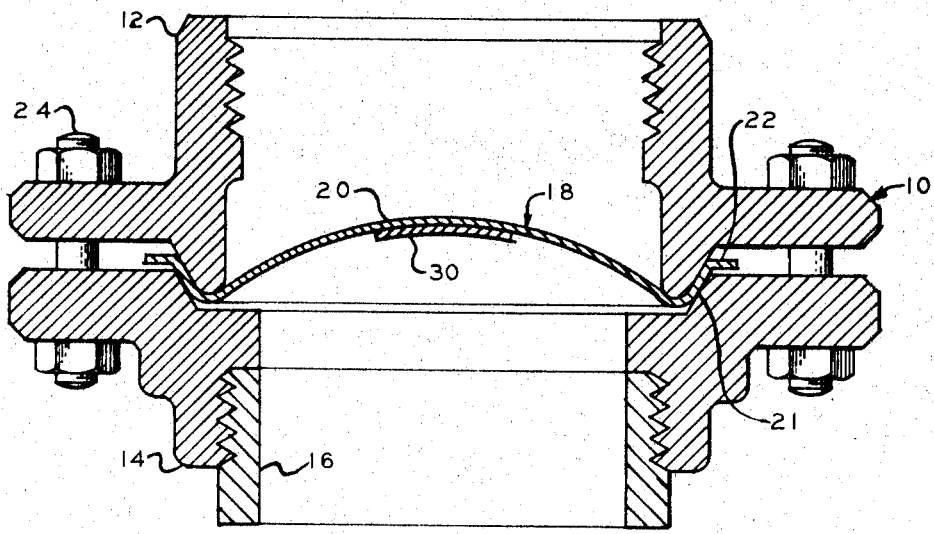
FIG. 1
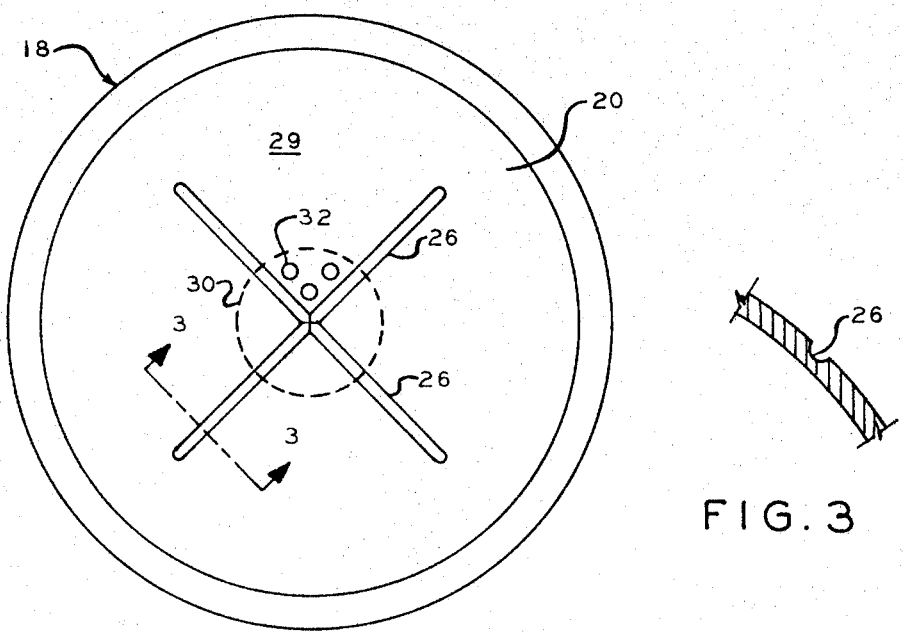
FIG. 2
FIG. 3
INVENTOR.
STANLEY M. MILLS
BY C. Clark Dougherty Jr
ATTORNEY INVENTOR.
STANLEY M. MILLS
BY C. Clark Dougherty Jr
ATTORNEY Aug. 26, 1969  S. M. MILLS  3,463,351
SAFETY PRESSURE RELIEF DEVICE
Filed Feb. 6, 1967  3 Sheets-Sheet 3

INVENTOR
STANLEY M. MILLS
BY C. Clark Daugherty Jr.
ATTORNEY

United States Patent Office 3,463,351
Patented Aug. 26, 1969

3,463,351
SAFETY PRESSURE RELIEF DEVICE
Stanley M. Mills, Kansas City, Mo., assignor to Black Sivalls & Bryson, Inc., Kansas City, Mo., a corporation of Delaware
Filed Feb. 6, 1967, Ser. No. 614,371
Int. Cl. F17c *13/06;* F17b *1/14;* B65d *25/00*
U.S. Cl. 220—89                                          6 Claims

ABSTRACT OF THE DISCLOSURE

The present invention relates to an improved safety pressure relief device of the rupturable type, and more particularly, to a safety pressure relief device which includes a dome-shaped rupturable disc containing lines of weakness set up by grooves milled or impressed on its concave or convex surface, and having a member or members attached to its concave surface, to achieve full opening without fragmentation.

BACKGROUND OF THE INVENTION

The present invention relates to rupturable apparatus used to relieve pressure from a pressure vessel or pressure system when an over-pressure condition exists within the vessel or system. Safety pressure devices of the rupturable type provide positive leak proof protection against over-pressure conditions which, if not relieved, could cause a pressure vessel or pressure system to explode. When the pressure level inside a pressure vessel or system including such a device reaches a pre-selected level, the device will rupture providing immediate pressure relief.

Prior to the present invention safety pressure relief devices of the rupturable type have been designed which include rupturable discs of many varied configurations. A re-occurring problem with these prior devices is that of achieving full opening without resulting in pieces of the disc breaking free. A safety pressure device including a disc with lines of weakness set up by grooves milled or impressed in the convex surface of the disc has previously been proposed in the patent to Coffman, No. 2,656,950. However, it has been found that while the disc reduces the possibility of fragmentation occuring, full opening is frequently not achieved. Quite often upon rupture of the disc only one of the sector-shaped portions of the disc formed by the lines of weakness will open, resulting in only partial pressure relief of the vessel or system being protected.

It has been discovered that a disc including lines of weakness set up by grooves which define four sector-shaped portions will open in one of three ways upon rupture—two adjoining sector-shaped portions will open with the other two remaining closed, the disc will split along one line of weakness completely across the disc resulting in an opening having the general shape of an ellipse, or all four sector-shaped portions will open which is, of course, the desired result.

This problem of partial opening is particularly emphasized with devices prior to the present invention when applied to low pressure service. Where the pressure vessel or system to be protected is designed to safely contain fluids at a relatively low pressure, it is essential that the safety pressure relief device achieve full opening. This is so since a pressure relief device for low pressure service must be of a relatively large diameter and must relieve a relatively large volume of fluid in order to lower the vessel or system pressure appreciably. The present invention provides means for effectively insuring the full opening of a pressure relief device in low as well as high pressure applications while at the same time insuring little or no fragmentation will take place.

SUMMARY OF THE INVENTION

The present invention is directed to the provision of grooves in a concave-convex rupture disc which set up lines of weakness in the disc and which define sector-shaped portions so that the disc will rupture along the lines of weakness rather than in an arbitrary manner. In addition, the present invention provides a member or members rigidly attached to one or more of the sector-shaped potrions formed by the lines of weakness so that as one section opens, all other sections are forced open. Thus, when a concave-convex rupture disc with grooves and with a member or members attached to sector-shaped portions of the disc defined by the grooves is combined with inlet and outlet supporting members, a safety pressure relief device is provided wherein complete opening of the disc is achieved upon rupture at all pressure levels, and the possibility of fragmentation of the disc occurring upon rupture is reduced to a minimum.

It is, therefore, an object of the present invention to provide an improved safety pressure relief device wherein through the provision of a dome-shaped frangible disc which includes lines of weakness set up by grooves converging at the center thereof, and defining a plurality of sector-shaped portions therein, the disc, upon rupture, will part along said lines of weakness rather than in an arbitrary manner, thereby reducing to a minimum the possibility of fragmentation occurring.

A further object of the present invention is the provision of a member or members rigidly attached to one or more of the angular sections defined by grooves in the concave-convex disc such that, upon rupture, when one line of weakness ruptures, or one portion of the disc opens, all other lines of weakness rupture and all sector-shaped portions defined thereby are opened.

Yet a further object of the present invention is to provide a safety pressure relief device for use in low pressure applications wherein through the provision of a dome-shaped frangible disc including grooves setting up lines of weakness in the disc, and including a member or members rigidly attached to one or more sector-shaped portions of the disc defined by said grooves, full opening of the disc is achieved.

Other and further objects, features and advantages will be apparent from the following description of presently preferred embodiments of the invention, given for the purpose of disclosure, and taken in conjunction with the accompanying drawings.

DESCRIPTION OF THE DRAWINGS

In the drawings forming a part of the disclosure herein, like character references designate like parts throughout the several views wherein, FIGURE 1 is an elevational view, in cross section, of a safety pressure relief device of the present invention, FIGURE 2 is a top plan view of the disc shown in FIGURE 1, FIGURE 3 is an enlarged section through the disc on the line 3—3 of FIGURE 2.

DESCRIPTION OF THE PREFERRED EMBODIMENT

Figure 4:
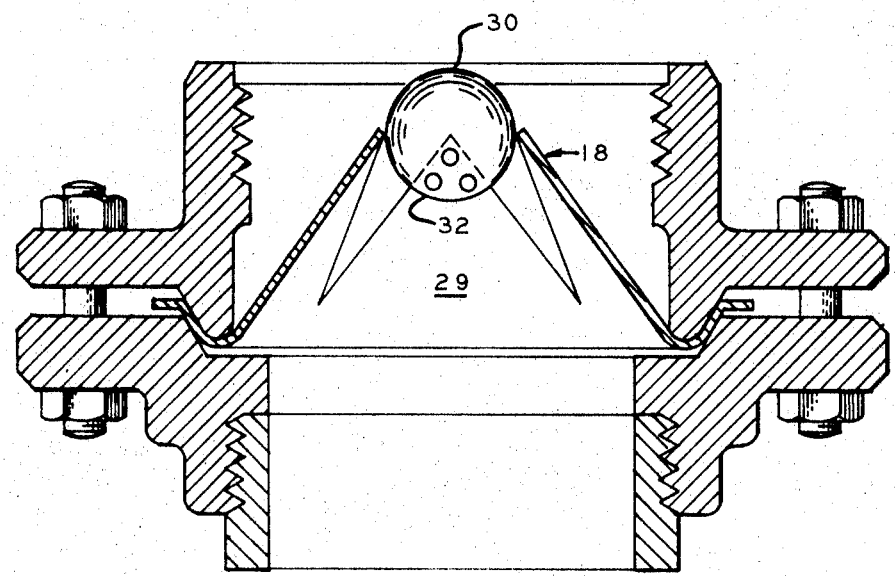
FIGURE 4 is an elevational view, in cross section, of the apparatus of FIGURE 1, illustrating the disc after rupture has occurred.

Referring now to the drawings, and particularly to FIGURE 1, reference numeral 10 generally designates the safety pressure relief device of the present invention. The pressure relief device 10 generally includes a pair of supporting members such as pipe flanges 12 and 14 and a rupturable disc 18.

Pipe 16 in threaded into pipe flange 14, the other end of which may be welded or threaded into a connection of a pressure vessel or pressure system to be protected from over pressure by the device 10. The concave surface of disc 18 is exposed to the pressure in the pressure vessel or system. The convex surface of disc 18 may be exposed to the atmosphere directly as shown, or pipe flange 12 may be connected by piping to an auxiliary vessel or system which is maintained at a pressure level lower than the pressure within the pressure vessel or system to be protected.

The disc 18 can be of various shapes and preferably consisis of a spherical sector portion 20 with the concave side being subjected to the pressure in the pressure vessel or system to be protected. The disc 18 also includes an annular flange portion 21, with a flat portion or lip 22 at its edge. The annular flange portion 21 is preferably at an angle from the horizontal plane of approximately thirty degrees.

The supporting pipe flanges 12 and 14 are provided with seating surfaces of proper shapes and dimensions to co-act with the disc and support, align, and hold the disc. The annular flange portion 21 is securely held along its entire circumference on both of its sides to prevent it from being subjected to any failure. It has been found that by positioning the seating surfaces at an angle of approximately thirty degrees from the horizontal as shown in FIGURE 1 the holding ability of the surfaces are increased over the holding ability of horizontal seating surfaces markedly. Also slight mis-alignment of the pipe flanges will have no detrimental effect since the seating surfaces will still contact the disc. Lip 22 facilitates the proper alignment of disc 18 during assembly of the safety pressure relief device. Each of pipe flanges 12 and 14 may include a plurality of openings so that pipe flanges 12 and 14 may be securely fastened together, such as by bolts 24.

The disc 18 is formed of sheet material of a tensile strength proportional to its diameter and thickness so that under normal pressures it will maintain its shape, but will yield and rupture when pressures exerted on the concave side exceed those for which it was designed. Referring to FIGURES 2 and 3, disc 18 has grooves 26 milled or impressed on its convex or concave surface, converging at its center and defining sector-shaped portions 29 thereon. Grooves 26 are illustrated in the drawings on the convex surface of spherical portion 20 for convenience; however, grooves 26 may be milled or impressed on either side of spherical section 20. The depth and width of grooves 26 are carefully controlled so that the disc will rupture at the desired pressure. In operation, when the pressure exerted on the concave side of disc 18 reaches a level which will cause disc 18 to rupture, disc 18 will have a tendency to tear along the lines of weakness set up by grooves 26 rather than in an arbitary manner. Thus, in operation disc 18 will rupture in a predetermined manner reducing to a minimum the possibility that fragmentation of the disc will occur.

Referring to FIGURES 1 and 2, disc 18 includes a member attached to the concave side of spherical sector portion 20 which may be of varying shape, but preferably is a small concave-convex disc 30. The convex side of disc 30 fits into the concave side of spherical portion 20. As shown in FIGURE 2, disc 30 is positioned with its center directly under the center of spherical portion 20, but is attached to spherical portion 20 only at a point within one of sector-shaped portions 29 defined by grooves 26. Any means may be used to attach disc 30, but preferably spot welds 32 are used. It is important that disc 30 contact all of sector-shaped portions 29, but be attached to only one such portion so that upon rupture of spherical portion 20 disc 30 is forced against all of angular sections 29 causing spherical portion 20 to tear along the lines of weakness set up by grooves 26. After rupture, disc 18 will achieve full opening as shown in FIGURE 4 with disc 30 remaining attached to the sector-shaped portion 29.

Disc 30 must be carefully sized in order to achieve proper opening of disc 18. It has been found that if disc 30 is too large, the force exerted on spherical portion 20 by disc 30 upon initial rupture is distributed over too large an area resulting in only partial opening. On the other hand, if disc 30 is too small the force exerted on spherical portion 20 will be concentrated in too small an area to cause initial tearing of all the lines of weakness set up by grooves 26. It has been determined that where disc 18 has a diameter of four inches or smaller, the diameter of disc 30 should be from twenty percent to thirty-five percent of the diameter of disc 18. Where disc 18 is larger than four inches in diameter, the diameter of disc 30 should be from fifteen percent to thirty percent of the diameter of disc 18.

Figure 5:
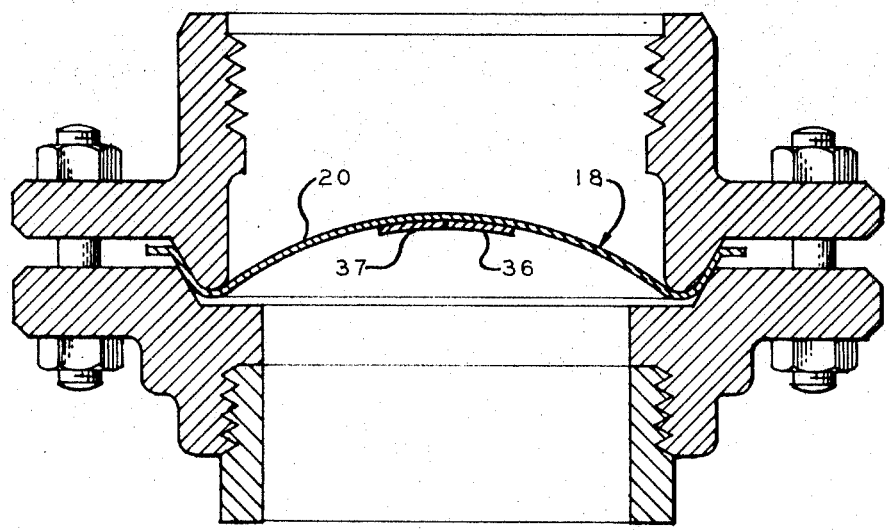
FIGURE 5 is an elevational view, in cross section of a safety relief device showing a modified form of the present invention.
Figure 6:
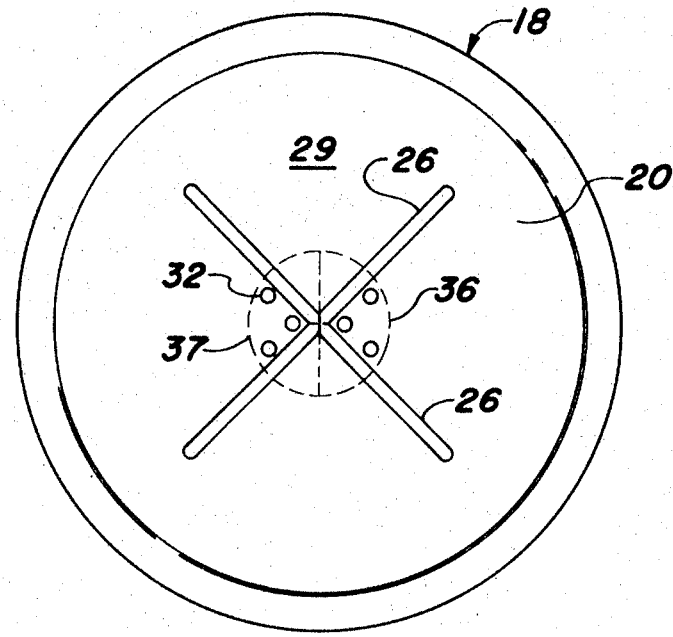
FIGURE 6 is a top plan view of the disc shown in FIGURE 5.
Figure 7:
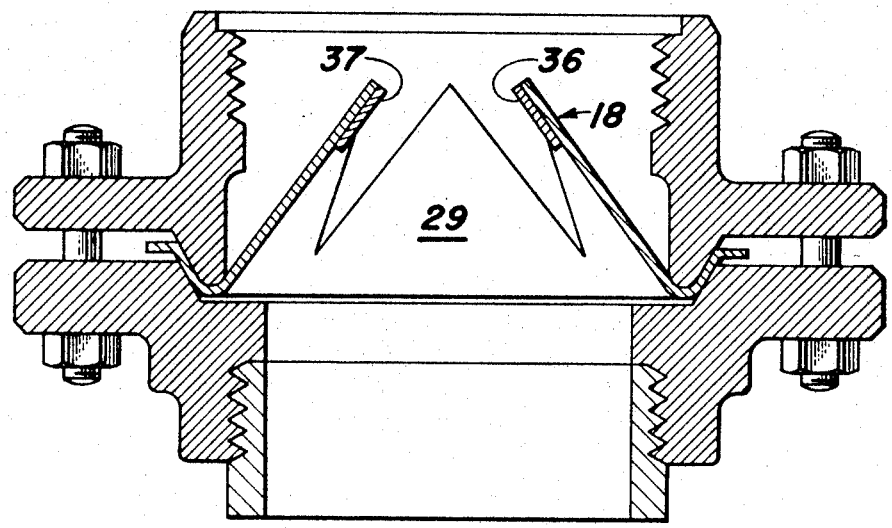
FIGURE 7 is an elevational view, in cross section, of the apparatus of FIGURE 5, illustrating the disc after rupture has occurred.

With reference now to FIGURES 5, 6, and 7, a modified form of the invention is illustrated. In this embodiment, spherical portion 20 of disc 18 has attached to it members 36 and 37 instead of a single member as previously described. Preferably members 36 and 37 are complimentary halves of a concave-convex disc. Referring to FIGURE 6, the convex side of member 36 fits against the concave side of spherical portion 20 and is attached to one of sector-shaped portions 29 by spot welds 32. The convex side of member 37 fits against the concave side of spherical portion 20 and is attached to an sector-shaped portion 29, opposite the sector-shaped portion 29 to which member 36 is attached. It is important that each of members 36 and 37 are positioned so that together they contact all of angular sections 29. Upon rupture of spherical portion 20, members 36 and 37 are forced against sector-shaped portions 29 causing spherical portion 20 to tear along all the lines of weakness set up by grooves 26. After rupture, disc 18 will achieve full opening as illustrated in FIGURE 7.

Thus provided is an improved pressure relief device which achieves full opening in a predetermined manner in low as well as high pressure applications.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art and which are encompassed within the spirit of the invention disclosed herein.

What is claimed is:

1. In a safety pressure relief device having a concave-convex rupture disc supported between inlet and outlet supporting members with the concave side subjected to pressure and having grooves converging at the center forming a plurality of sector-shaped portions, the improvement comprising, said disc having a member rigidly attached to the concave side, said member having a diameter no greater than thirty-five percent of the diameter of said disc and having the center adjacent the center of said disc so that all of said sector-shaped portions are contacted and caused to be opened by said member upon rupture of said disc.

2. The apparatus of claim 1 wherein said member is a concave-convex disc attached to said rupture disc at a point within one of said sector-shaped portions.

3. In a safety pressure relief device having a concave-convex rupture disc supported between inlet and outlet supporting members with the concave side subjected to pressure and having grooves converging at the center forming a plurality of sector-shaped portions therein, the improvement comprising, said disc having two or more complimentary members rigidly attached to the concave side, said two or more complimentary members having a combined diameter no greater than thirty-five percent of the diameter of said disc and having the center adjacent the center of said disc so that all of said sector-shaped portions are contacted and caused to be opened by said members upon rupture of said disc.

4. The apparatus of claim 3 wherein said complimentary members form a concave-convex disc, each member being attached to said rupture disc at a point within one of said sector-shaped portions.

5. The apparatus of claim 4 wherein said grooves form right angles with each other so that four equal sector-shaped portions are defined in said rupture disc.

6. In a safety pressure relief device having a concave-convex rupture disc supported between inlet and outlet supporting members with the concave side subjected to pressure and having grooves converging at the center forming right angles with each other so that four equal sector-shaped portions are defined therein, the improvement comprising:

said rupture disc having a concave-convex disc rigidly attached to the concave side at a point within one of said sector-shaped portions, said concave-convex disc having a diameter no greater than thirty-five percent of the diameter of said rupture disc and having the center adjacent the center of said rupture disc so that all of said sector-shaped portions are contacted and caused to be opened by said concave-convex disc upon rupture of said rupture disc.

References Cited

UNITED STATES PATENTS

| 2,523,068 | 9/1950 | Simpson et al. |
| 2,656,950 | 10/1953 | Coffman. |
| 3,005,573 | 10/1961 | Dawson et al. |

FOREIGN PATENTS

| 748,953 | 5/1956 | Great Britain. |

RAPHAEL H. SCHWARTZ, Primary Examiner